Patented Apr. 13, 1926.

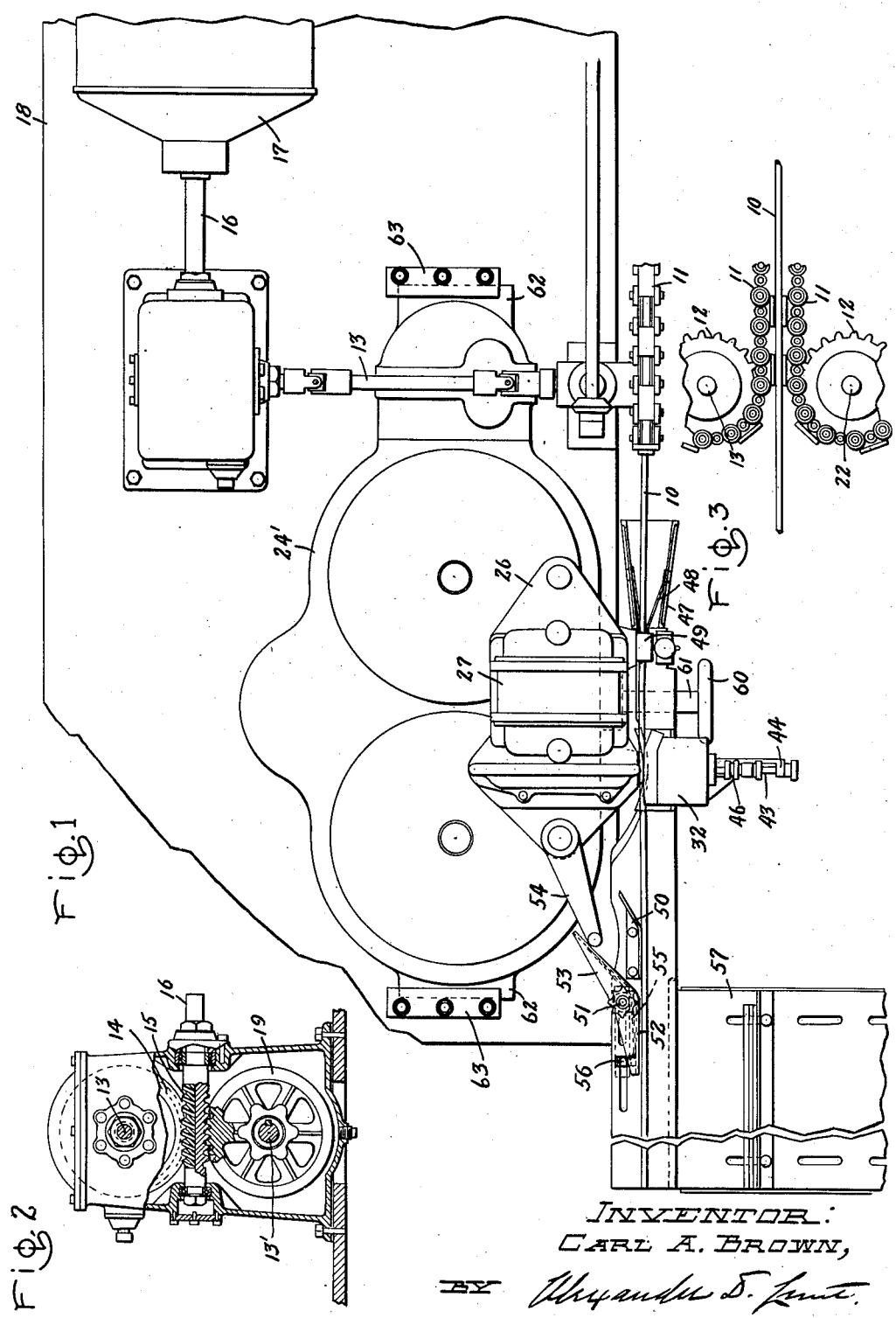

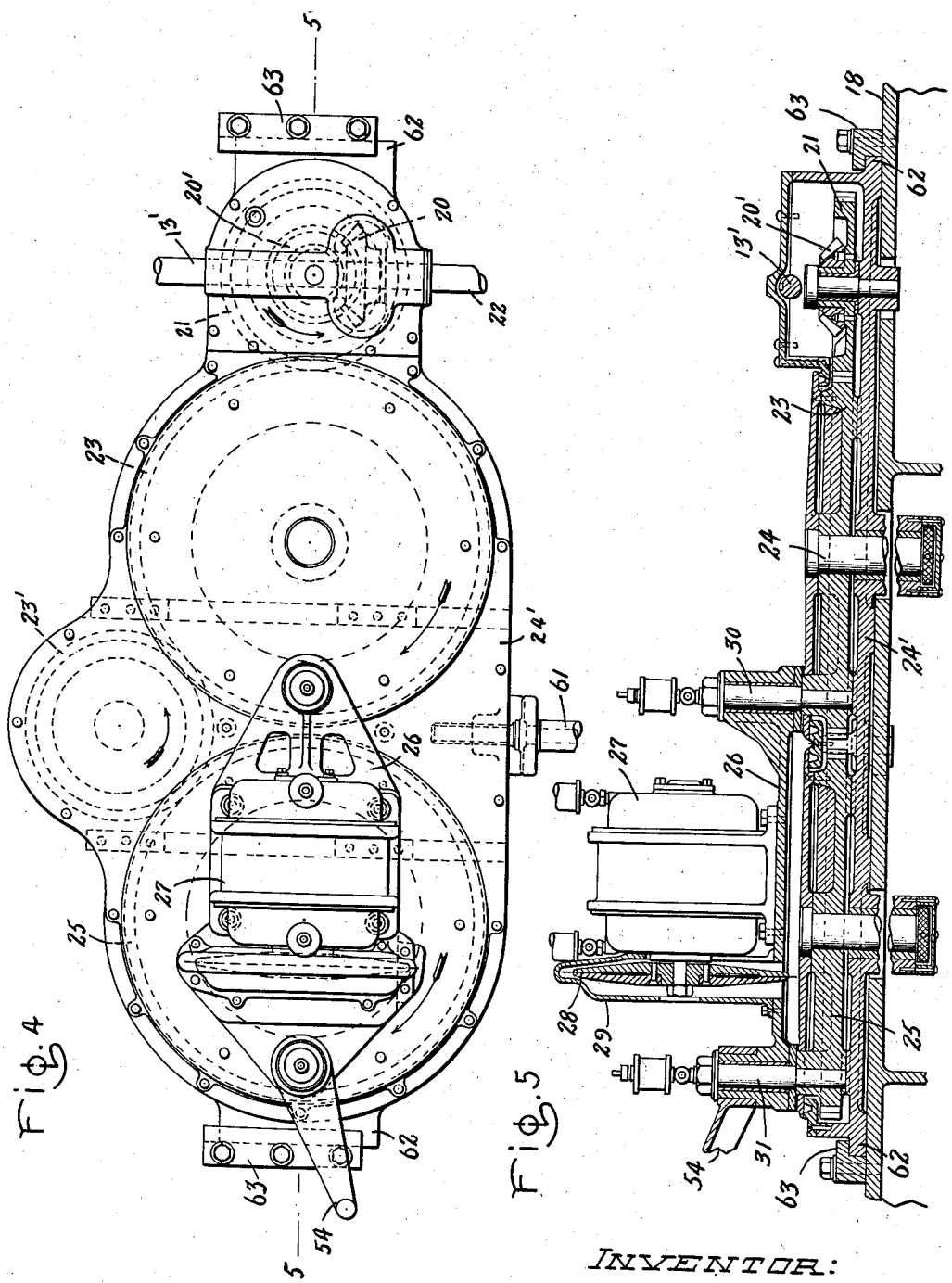

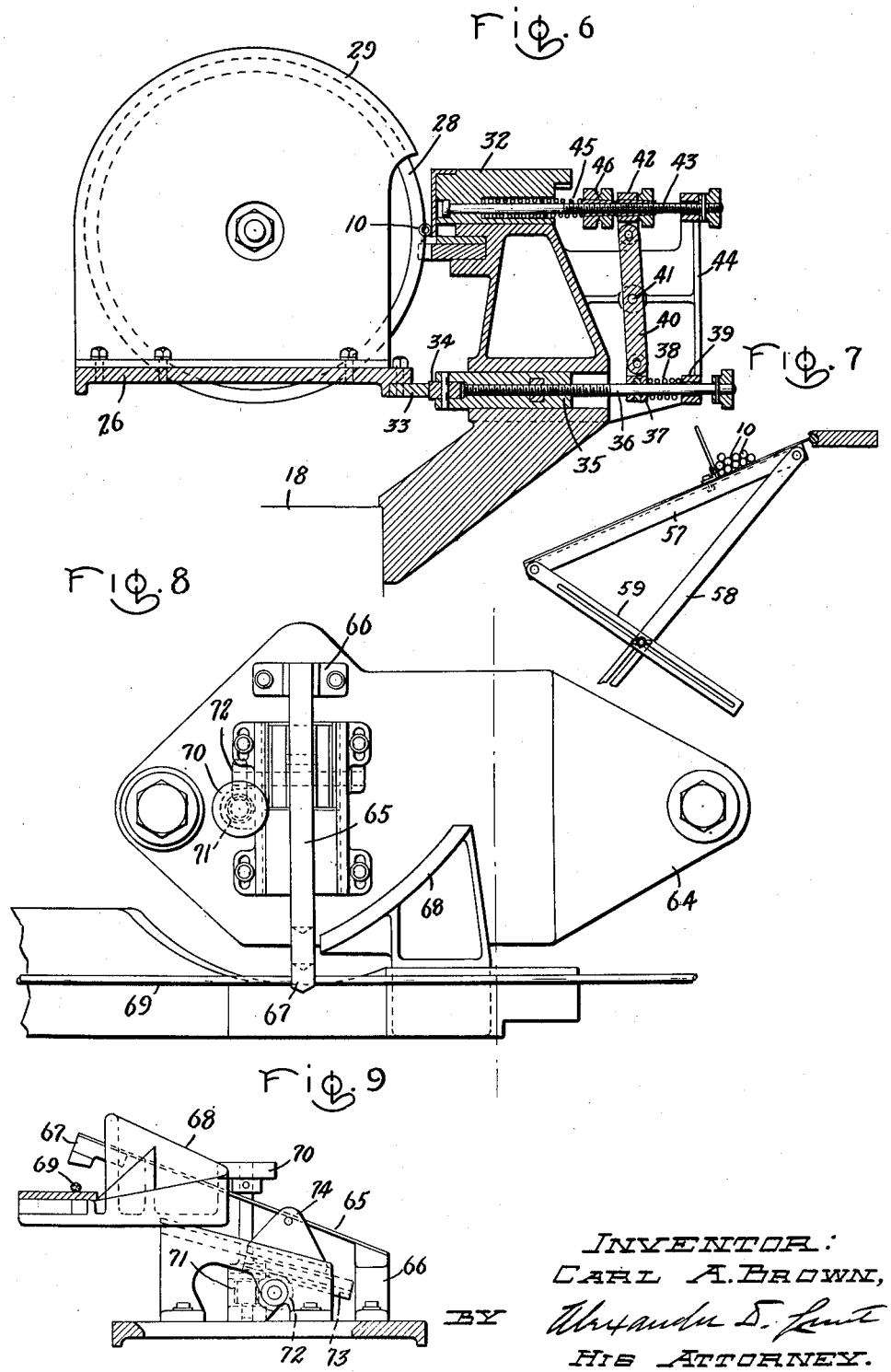

1,580,809

UNITED STATES PATENT OFFICE.

CARL A. BROWN, OF EAST CLEVELAND, OHIO, ASSIGNOR TO GENERAL ELECTRIC COMPANY, A CORPORATION OF NEW YORK.

GLASS-SEVERING APPARATUS.

Application filed November 3, 1922. Serial No. 598,908.

*To all whom it may concern:*

Be it known that I, CARL A. BROWN, a citizen of the United States, residing at East Cleveland, in the county of Cuyahoga, State of Ohio, have invented certain new and useful Improvements in Glass-Severing Apparatus, of which the following is a specification.

My invention relates to apparatus for severing glass cane and tubing and is particularly applicable as an accessory to machines such as the Danner for drawing glass cane and tubing. My invention is an improvement over the severing portion of the apparatus disclosed in Danner Patent 1,220,201, issued March 27, 1917. In that patent there is disclosed a cutting wheel, rotating means therefor and means whereby the said wheel is brought into and out of operative relation with the traveling glass cane or tubing, the arrangement being such that the cutting wheel is first brought into engagement with the glass cane or tubing, is then reciprocated therewith, then raised out of the path of the glass and reciprocated back to its original position. The movements of the cutting wheel are timed with the advance of the tubing or cane so that regular lengths of the latter are cut. There is provided also a striking device which breaks the glass or tubing after it has been scored by the cutting wheel.

One of the distinguishing features of my invention is that the cutting wheel is brought into and out of operative position at proper intervals by a simple rotation of its mounting. The construction is much more compact than that disclosed in the Danner patent, and is much simpler, requiring a great many less parts. It also permits of greater speed of operation and has much less vibration. Various other features and advantages of my invention will appear from the detailed description of an embodiment thereof which follows.

In the drawing, Fig. 1 is a fragmentary plan view of my severing apparatus attached to a Danner machine; Fig. 2 is an end elevation partially in section of the main driving mechanism; Fig. 3 is a partial elevation of the chain traction means; Fig. 4 is a plan view showing the cutting wheel, the driving motor therefor and the mechanism for bringing the same into and out of operative relation with the tubing or cane; Fig. 5 is a vertical section thereof on the line 5—5; Fig. 6 is a vertical elevation partially in section showing the anvil portion of the device; Fig. 7 is a side elevation of the tubing or cane receiver; Fig. 8 is a plan of a modification which may be used for severing cane; and Fig. 9 is a partial side elevation thereof.

The glass tubing or cane 10 is drawn from a supply of molten glass, as disclosed in the Danner patent hereinbefore referred to, by means of feed chains 11, the latter being driven through sprockets 12 which are in turn driven by suitably upper and lower shafts 13 and 13' respectively. Shaft 13 carries at its opposite end the gear 14 with which meshes the worm 15 driven through shaft 16 by the main drive motor 17, suitably supported upon the base of the machine 18. The worm 15 also meshes with the gear 19 which is splined upon the shaft 13' which drives through the bevel gears 20 and 20' the horizontally disposed gear wheel 21 and the extension 22 of which drives the lower sprocket 12. The gear wheel 21 meshes with the large horizontal gear wheel 23 mounted upon the stud 24, which is suitably supported in a bearing on the frame 24'. The said gear wheel 23 in turn meshes with the idler 23', which meshes with another horizontally disposed gear wheel 25 which is similar to 23. The result is that the gears 23 and 25 rotate in the same direction. A frame 26 which carries a motor 27 and a cutting wheel driven thereby 28, and which has a housing 29, is pivotally supported by two studs 30 and 31, which are carried by the gear wheels 23 and 25 respectively, near their periphery. The cutting wheel is preferably of steel. The rotation of the gears 23 and 25 serves to carry the cutting wheel into and out of operative relation with the glass tubing or cane so that the latter is scored periodically, after which the cutting wheel is removed from the path of the travel and brought into said path again periodically at uniform intervals. This tends to cause the severance of uniform lengths of glass cane or tubing. An anvil 32 is brought into operative relation with the glass tubing during the engagement therewith of the cutting wheel and removed from such relation after the scoring has been accomplished. As shown in Figs. 4 and 6, the anvil 32 is operated through a mechanism which is actuated by a cam 33, carried by the frame supporting the cutting wheel and its drive. Said cam engages a roller 34 carried by a slide rod 35 which carries the adjustable rod 36 having thereon a collar 37 engaged by a spring 38 bearing against a block 39. Pivoted to said collar is a lever 40 which is fulcrumed at 41 and has its opposite end pivoted to a collar 42 keyed to rod 43 slidably supported in the frame 44. The rod 43 passes through the anvil and the spring 45 extends around the same, bearing against the end of a recess in the said anvil and against a collar 46 on said rod. The end of the rod 43 is shouldered and is located within a recess in the anvil 32 so that the said anvil may give somewhat so as to avoid undue pressure against the glass cane or tubing. The rods 36 and 43 permit adjustment of the throw of the sliding parts 35 and 32 respectively and are threaded for this purpose.

A guide 47 having the spring members 48 which engage the glass cane or tubing, and a roller 49, is encountered by the glass cane or tubing before reaching the anvil. A stationary guide 50 is also disposed to be engaged by the glass cane or tubing after passing the anvil. After the scoring by the cutting wheel, a device is provided to strike a blow on the scored cane or tubing so as to cause a break at the point of scoring. This device comprises a striker having a pivot 51 and comprising two wings 52 and 53. The latter is encountered by an arm 54 carried by the cutting wheel motor frame. A spring 55 is mounted so as to engage each of the wings 52 and 53 so that after the arm 54 passes the wing 53, the latter springs back to its normal position and the wing 52 is forced away from contact with the glass. An adjustable stop 56 serves to limit the movement of the striker and the end of the spring 55 is attached thereto. The throw of the striker may be regulated by altering the position of the pivot 51 in the frame slot.

After the severance of the glass cane and tubing, the sections are delivered onto an inclined receiver 57 which, as shown in Fig. 7, is adjusted by means of the supports 58 and 59. The striker serves to push each section toward the receiver.

The position of the cutting wheel and its operating parts, together with the support therefor, may be adjusted transversely of the machine through a handwheel 60 which operates the shaft 61 having a shoulder engaging the base of the machine, and which is threaded in the frame 24'. The said frame carries lugs 62 engaged by flanges 63, provided with clamping means so that the frame is securely held in the desired position.

In operation the cane or tubing 10 is drawn from the supply of molten glass by means of the chains 11 and associated parts as set forth in the Danner patent hereinbefore referred to. It then traverses the guide 47 and the face of the anvil 32. The frame 24' having been properly adjusted, the cutting wheel 28 is caused to contact with the glass cane or tubing by being carried to such position by the rotation of the plates 23 and 25, and scores the glass cane or tubing, after which the wheel is carried out of engagement. When the scored portion of the cane or tubing has reached the hammer 52, the latter is caused to strike it a blow by contact of the arm 54 with the wing 53 after which the hammer is forced back to its original position and engages the stop 56. On account of the driving connections, the cutting wheel is periodically brought into engagement with a fresh portion of the glass cane or tubing, and this results in the cutting of uniform sections.

In Figs. 8 and 9 is illustrated a modification which is especially adapted for cutting glass cane. A plate 64 is pivotally mounted on the plates 23 and 25 in the same manner as the motor frame in the form of the invention above described. A spring 65 is rigidly mounted at one end on the support 66 and its other end carries the hammer 67. The said hammer engages during the travel of the plate 64, an inclined cam 68 and rises upon the same until it reaches the end thereof, being bent back until that time when its elasticity causes it to strike a blow upon the cane glass 69, thus breaking it. The tension of the spring 65 is adjusted through the member 70 which carries the worm 71 engaging the gear 72 which engages a rack 73 upon which is supported the member 74 which carries the said spring.

What I claim as new and desire to secure by Letters Patent of the United States, is:

1. The combination with a traction means for causing glass cane or tubing to travel in a substantially horizontal direction, of a severing means comprising a cutting wheel and rotating means therefor, a support for said severing means and rotating means for said support, said parts being mounted and arranged so that a simple rotating of said supporting means causes said cutting wheel to be brought into and out of the path of travel of said cane or tubing while maintaining said cutting wheel always in substantially the same plane and to sever predetermined lengths therefrom.

2. The combination with a traction means for causing glass cane or tubing to travel in a substantially horizontal direction, of a severing means comprising a cutting wheel and rotating means therefor, substantially horizontally disposed supporting means for said severing means, means for rotating said supporting means in a substantially horizontal plane, said parts being constructed and arranged so that simple rotation of said supporting means serves to bring said cutting wheel into and out of the path of travel of said cane or tubing while maintaining said cutting wheel always in substantially the same plane and to sever predetermined lengths therefrom.

3. The combination with traction means for causing glass cane or tubing to travel in a substantially horizontal direction of a severing means comprising a frame carrying a cutting device and actuating means therefor, a substantially horizontally disposed supporting means for said frame, comprising a pair of substantially horizontally disposed rotary members to each of which said frame is pivoted, means for rotating said members in unison so as to carry said cutting device at regular intervals into and out of the path of travel of said cane or tubing and means for securing a desired relation between the speed of said rotating means and that of said traction means.

4. The combination with traction means for causing glass cane or tubing to travel in a substantially horizontal direction of a severing means comprising a frame carrying a substantially vertically disposed cutting wheel and rotating means therefor, substantially horizontally disposed supporting means for said frame, comprising a pair of substantially horizontally disposed rotary members to each of which said frame is pivoted, means for rotating said members in unison so as to carry said cutting wheel at regular intervals into and out of the path of travel of said cane or tubing and means for securing a desired relation between the speed of said rotating means and that of said traction means.

5. The combination with traction means for causing glass cane or tubing to travel in a substantially horizontal direction of a severing means comprising a frame carrying a cutting wheel and rotating means therefor, substantially horizontally disposed supporting means for said frame, means for rotating said supporting means so as to carry said cutting wheel at regular intervals into and out of the path of travel of said cane or tubing while maintaining said cutting wheel always in substantially the same plane, means for securing a desired relation between the speed of said rotating means and that of said traction means, an anvil mounted opposite to the cutting position of said wheel and on the opposite side of the path of travel of said cane or tubing and means for moving said anvil toward said path upon the arrival of said wheel in cutting position.

6. The combination with a traction means for causing glass cane or tubing to travel in a substantially horizontal direction, of a severing means comprising a cutting wheel and rotating means therefor, substantially horizontally disposed supporting means for said severing means, means for rotating said supporting means, said parts being constructed and arranged so that simple rotation serves to bring said cutting wheel into and out of the path of travel of said cane or tubing to sever lengths therefrom while maintaining said cutting wheel always in substantially the same plane, and means for securing the desired relation between the speed of said support rotating means and that of said traction means to obtain desired lengths.

In witness whereof, I have hereunto set my hand this 1st day of November, 1922.

CARL A. BROWN.